US006331590B1

United States Patent
Herrmann et al.

(10) Patent No.: US 6,331,590 B1
(45) Date of Patent: Dec. 18, 2001

(54) POLYPROPYLENE WAX

(75) Inventors: Hans-Friedrich Herrmann, Gross-Gerau; Gerd Hohner, Gersthofen, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/578,961

(22) Filed: May 25, 2000

Related U.S. Application Data

(62) Division of application No. 09/112,855, filed on Jul. 10, 1998, now Pat. No. 6,143,846.

(30) Foreign Application Priority Data

Jul. 11, 1997 (DE) .............................. 197 29 833

(51) Int. Cl.$^7$ .......................... C08L 23/12; C09D 11/12; C09D 123/12
(52) U.S. Cl. .......................... 525/55; 526/351; 523/160; 523/161; 430/56; 430/135; 430/965; 106/31.13; 106/31.62; 106/270; 106/272
(58) Field of Search ............................. 526/351; 525/55; 523/160, 161; 430/56, 135, 965; 106/31.13, 31.62, 270, 272

(56) References Cited

U.S. PATENT DOCUMENTS

| 3,951,935 | 4/1976 | Engelmann | 526/129 |
|---|---|---|---|
| 4,962,248 | 10/1990 | Winter et al. | 585/12 |
| 4,962,262 | 10/1990 | Winter et al. | 585/512 |
| 5,081,322 | 1/1992 | Winter et al. | 585/9 |
| 5,416,153 | 5/1995 | Winter et al. | 524/489 |
| 5,420,217 | 5/1995 | Canich | 526/127 |
| 5,723,705 * | 3/1998 | Herrmann et al. | 585/9 |
| 5,750,813 | 5/1998 | Hess et al. | 585/12 |
| 5,929,264 | 7/1999 | Rohrmann et al. | 556/11 |

FOREIGN PATENT DOCUMENTS

| 625142 | 9/1990 | (AU) . |
|---|---|---|
| 2329641 | 12/1974 | (DE) . |
| 321852 | 6/1989 | (EP) . |
| 321853 | 6/1989 | (EP) . |
| 0563834 | 10/1993 | (EP) . |
| 0571882 | 12/1993 | (EP) . |
| 584586 | 3/1994 | (EP) . |
| 584586B1 * | 3/1994 | (EP) . |
| 0602509 | 6/1994 | (EP) . |
| 0719802 | 7/1996 | (EP) . |
| 9510962 | 7/1996 | (ZA) . |

OTHER PUBLICATIONS

Skoog, Principles of Instrumental Analysis, Saunders, pp. 5–9, 1985.

\* cited by examiner

Primary Examiner—David W. Wu
Assistant Examiner—R. Rabago
(74) Attorney, Agent, or Firm—Susan S. Jackson; Scott E. Hanf

(57) ABSTRACT

The present invention relates to homopolymer and copolymer waxes which have been prepared by polymerization using metallocene compounds in the presence of hydrogen and have a melt viscosity of less then 100 mPas, measured at 170° C. As a result of their high thermal stabillty, these waxes display neither discoloration nor crosslinking reactions and are vary well suited for use in toners, for plastics processing, for masterbatches, for printing inks, surface coatings and melt adhesives.

12 Claims, No Drawings

POLYPROPYLENE WAX

CROSS-REFERENCES TO RELATED APPLICATIONS

This is a division of application Ser. No. 09/112,855, filed Jul. 10, 1998 now U.S. Pat. No. 6,143,846.

The present invention relates to a low-viscosity, hard polypropylene wax, to a process for its preparation and to its use.

The thermal degradation of isotactic polypropylene gives hard PP waxes, but is energy-intensive and leads to sometimes discolored products which contain double bonds.

The polymerization of propene using Ziegler-Natta catalysts (EP-A-584 586, DE-A-23 29 641) requires large amounts of hydrogen and is therefore likewise restricted to relatively high-viscosity waxes.

The preparation of 1-olefin polymer waxes which have a narrow molecular weight distribution and a high isotacticity by means of metallocenes is known. However, the resulting products continue to have a melt viscosity of 100 mPas even when regulation is carried out by means of a high hydrogen level (EP-A-321 852).

EP-A-321 853 describes the use of metallocene catalysts for preparing low molecular weight PP waxes. However, the resulting products have a low isotacticity of less than 70%.

Furthermore, there are metallocenes (EP-A-416 566) which have been used for preparing polypropylene of different molecular weight depending on the polymerization temperature. The mean molecular weight decreases as the polymerization temperature increases. The products prepared by this method have unsaturated chain ends and therefore have little thermal stability in use. it is therefore an object of the invention to prepare very low-viscosity polypropylene waxes having a high hardness and good thermal stability.

It has been found that polymerization of propene together with comonomers using metallocenes and, in addition, hydrogen enables novel low molecular weight PP waxes to be prepared. These have a melt viscosity of less than 100 mPas at 170° C. and have no unsaturated or polar groups in the chain, which groups could promote discoloration and crosslinking reactions. The polypropylene homopolymer waxes preferably have an isotacticity of greater than 70% and a heat of fusion of greater than or equal to 80 J/g in order to ensure a high hardness.

The invention accordingly provides hard PP homopolymer and PP copolymer waxes prepared using metallocenes and having saturated chain ends, where the wax has no unsaturated end groups or less than 10% of unsaturated end groups, a melt viscosity of less than 100 mPas measured at 170° C. and an isotactic index of greater than or equal to 70%. The invention also provides for the use of these waxes.

It has also been found that these novel waxes can be advantageously employed in many fields of application. As a component of toners, they allow good miscibility in toner production owing to their low viscosity. Low-viscosity PP waxes are therefore employed, in particular, as a component in black and color toners in photocopiers and laser printers.

In the same way, these waxes can be advantageously used for producing printing inks, in surface coatings and as a component in melt adhesives.

If pulverulent mixtures are to be prepared, the high crystallinity of the waxes allows them to be readily milled during mixing and avoids conglutination of the powders, as is regularly observed when using low-isotacticity waxes.

In all applications, discoloration or crosslinking of the melt is avoided, as a result of which the user experiences no alteration of the wax melt even at high temperatures and long waiting times in processing machines.

For this reason, the use of the waxes prepared in this way as auxiliaries in plastics processing, for example as lubricant, is very advantageous. Their use in the preparation of masterbatches, for example of pigments or dyes for coloring polymers, is particularly advantageous. The low viscosity of the wax melt allows improved wetting and dispersion of the colorants and thereby increases the color yield and intensity.

Preference is given to polyolefin waxes prepared using sandwich chelate compounds, in particular those prepared using metallocene compounds, wherein the metallocene is a compound of the formula I:

This formula also encompasses compounds of the formula Ia

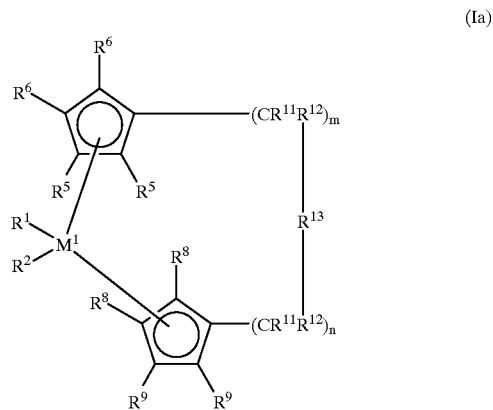

and the formula Ib

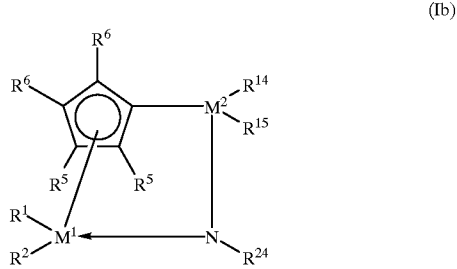

In the formulae I, Ia and Ib, $M^1$ is a metal of group IVb, Vb or VIb of the Periodic Table, for example titanium, zirconium, hafnium, vanadium, niobium, tantalum, chromium, molybdenum, tungsten, preferably titanium, zirconium and hafnium.

$R^1$ and $R^2$ are identical or different and are each a hydrogen atom, a $C_1$–$C_{10}$-, preferably $C_1$–$C_3$-alkyl group, in particular methyl, a $C_1$–$C_{10}$-, preferably $C_1$–$C_3$-alkoxy group, a $C_6$–$C_{10}$-, preferably $C_6$–$C_8$-aryl group, a $C_6$–$C_8$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group or a halogen atom, preferably chlorine.

$R^3$ and $R^4$ are identical or different and are each a monocyclic or polycyclic hydrocarbon radical which can form a sandwich structure with the central atom $M^1$. $R^3$ and $R^4$ are preferably cyclopentadienyl, indenyl, benzindenyl or fluorenyl, where the base structures can also bear additional substituents or be bridged to one another. In addition, one of the radicals $R^3$ and $R^4$ can be a substituted nitrogen atom, where $R^{24}$ is as defined for $R^{17}$ and is preferably methyl, t-butyl or cyclohexyl.

$R^5$, $R^6$, $R^7$, $R^8$, $R^9$ and $R^{10}$ are identical or different and are each a hydrogen atom, a halogen atom, preferably a fluorine, chlorine or bromine atom, a $C_1$–$C_{10}$-, preferably $C_1$–$C_4$-alkyl group, a $C_6$–$C_{10}$-, preferably $C_6$–$C_8$-aryl group, a $C_1$–$C_1$-, preferably $C_1$–$C_3$-alkoxy group, an —$NR^{16}{}_2$—, —$SR^{16}$—, —$OSiR^{16}{}_3$—, —$SiR^{16}{}_3$— or —$PR^{16}{}_2$ radical, where $R^{16}$ is a $C_1$–$C_{10}$-, preferably $C_1$–$C_3$-alkyl group or $C_6$–$C_{10}$-, preferably $C_6$–$C_8$-alkyl group, or in the case of Si- or P-containing radicals is also a halogen atom, preferably a chlorine atom, or two adjacent radicals $R^5$, $R^6$, $R^7$, $R^8$, $R^9$ or $R^{10}$ together with the carbon atoms connecting them form a ring. Particularly preferred ligands are the substituted compounds of the base structures indenyl, benzindenyl, fluorenyl and cyclopentadienyl.

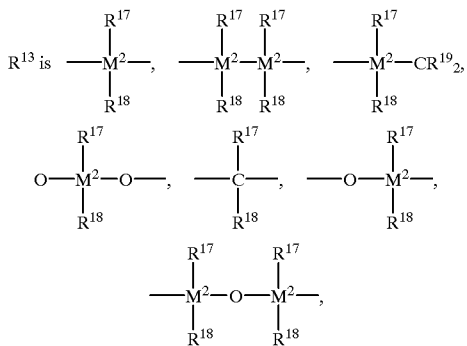

=$BR^{17}$, =$AlR^{17}$, —Ge—, —Sn—, —O—, —S—, =SO, =$SO_2$, =$NR^{15}$, =CO, =$PR^{15}$ or =$P(O)R^{15}$, where $R^{17}$, $R^{18}$ and $R^{19}$ are identical or different and are each a hydrogen atom, a halogen atom, a $C_1$–$C_{30}$-, preferably $C_1$–$C_4$-alkyl group, in particular a methyl group, a $C_1$–$C_{10}$-fluoroalkyl group, preferably a $CF_3$ group, a $C_6$–$C_{10}$-fluoroaryl group, preferably a pentafluorophenyl group, a $C_6$–$C_{10}$-, preferably $C_6$–$C_8$-aryl group, a $C_1$–$C_{10}$-, preferably $C_1$–$C_4$-alkoxy group, in particular a methoxy group, a $C_2$–$C_{10}$-, preferably $C_2$–$C_4$-alkenyl group, a $C_7$–$C_{40}$-, preferably $C_7$–$C_{10}$-arylalkyl group, a $C_8$–$C_{40}$-, preferably $C_8$–$C_{12}$-arylalkenyl group or a $C_7$–$C_{40}$-, preferably $C_7$–$C_{12}$-alkylaryl group, or $R^{17}$ and $R^{18}$ or $R^{17}$ and $R^{19}$, in each case together with the atoms connecting them, form a ring.

$M^2$ is silicon, germanium or tin, preferably silicon or germanium.

$R^{13}$ is preferably =$CR^{17}R^{18}$, =$SiR^{17}R^{18}$, =$GeR^{17}R^{18}$, —O—, —S—, =SO, =$PR^{17}$ or =$P(O)R^{17}$.

$R^{11}$ and $R^{12}$ are identical or different and are as defined for $R^{17}$ m and n are identical or different and are zero, 1 or 2, preferably zero or 1, where m plus n is zero, 1 or 2, preferably zero or 1.

$R^{14}$ and $R^{15}$ are as defined for $R^{17}$ and $R^{18}$.

Examples of suitable metallocenes are the rac isomers of:
 ethylenebis-1-(2-methyltetrahydroindenyl)zirconium dichloride,
 ethylenebis-1-(4,7-dimethylindenyl)zirconium dichloride,
 ethylenebis-1-(2-methyl-4-phenylindenyl)zirconium dichloride,
 ethylenebis-1-(2-methyl-4,5-benzindenyl)zirconium dichloride,
 ethylenebis-1-(2-methyl-4,5-benzo-6,7-dihydroindenyl) zirconium dichloride,
 ethylenebis-1-(2-methylindenyl)zirconium dichloride,
 ethylenebis-1-tetrahydroindenylzirconium dichloride,
 and also the alkyl or aryl derivatives of each of these metallocene dichlorides.

To activate the single-center catalyst systems, suitable cocatalysts are used. Suitable cocatalysts for metallocenes of the formula I are organoaluminum compounds, in particular aluminoxanes, or aluminum-free systems such as $R^{22}{}_xNH_{4-x}BR^{23}{}_4$, $R^{22}{}_xPH_{4-x}BR^{23}{}_4$, $R^{22}{}_3CBR^{23}{}_4$ or $BR^{23}{}_3$. In these formulae, x is from 1 to 4, the radicals $R^{22}$ are identical or different, preferably identical, and are $C_1$–$C_{10}$-alkyl or $C_6$–$C_{18}$-aryl or two radicals $R^{22}$ together with the atom connecting them form a ring, and the radicals $R^{23}$ are identical or different, preferably identical, and are $C_6$–$C_{18}$-aryl which may be substituted by alkyl, haloalkyl or fluorine. In particular, $R^{22}$ is ethyl, propyl, butyl or phenyl and $R^{23}$ is phenyl, pentafluorophenyl, 3,5-bis(trifluoromethyl)phenyl, mesityl, xylyl or tolyl.

These cocatalysts are particularly suitable in combination with metallocenes of the formula I when $R^1$ and $R^2$ are each a $C_1$–$C_{10}$-alkyl group or an aryl or benzyl group, preferably a methyl group. Derivative formation to give the metallocenes of the formula I can be carried out by literature methods, for example by reaction with alkylating agents such as methyllithium (cf. Organometailics 9 (1990) 1359; J. Am. Chem. Soc. 95 (1973) 6263).

In addition, a third component is frequently necessary to provide protection against polar catalyst poisons. Organoaluminum compounds such as triethylaluminum, tributylaluminum and others, and also mixtures, are suitable for this purpose.

Depending on the process, supported single-center catalysts can also be used. Preference is given to catalyst systems for which the residual contents of support material and cocatalyst in the product do not exceed a concentration of 100 ppm.

To prepare the waxes of the invention, propene is polymerized in the presence of hydrogen and also, if desired, further olefins or diolefins having from 2 to 18 carbon atoms as comonomers. Examples of comonomers which can be used are ethylene, 1-butene, 1-pentene, 1-hexene, 1-octene, 2-methyl-1-propene, 3-methyl-1-butene, 3-methyl-1-pentene, 4-methyl-1-pentene, 4-methyl-1-hexene, styrene or cyclic olefins such as cyclopentene, cyclohexene, norbornene, 1,4,5,8-dimethano-1,2,3,4,4a,5,8,8a-octahydronaphthalene and their structural derivatives and also diolefins such as 1,5-hexadiene, 1,7-octadiene, 1,3- or 1,5-cyclooctadiene. Preference is given to the polymerization of propylene and the copolymerization of propylene with a 1-olefin having from 2 to 10 carbon atoms. Examples of copolymer waxes are propylene-ethylene, propylene-1-butene and propylene-1-hexene waxes.

Examples of terpolymers are propylene-ethylene-1-butene or propylene-ethylene-1,5-hexadiene terpolymer waxes.

Copolymer waxes contain from 0 to 20% by weight of the comonomer, based on the total polymer. Terpolymer waxes comprise at least 80% by weight. of the main monomer, where the two comonomers are each present in an amount of up to 19% by weight, but the sum of both comonomers does not exceed 20% by weight of the total monomer.

The waxes of the invention contain less than 10% of unsaturated end groups, preferably less than 5% of unsaturated end groups.

The isotactic polypropylene homopolymer waxes prepared by this process have an isotacticity of greater than 70% and a heat of fusion ΔH of greater than or equal to 80 J/g in order to ensure a high hardness.

The waxes of the invention can be prepared in any suitable type of reactor, for example a loop reactor, autoclave or gas-phase reactor. The regulation of the molecular weight is preferably not carried out by varying the polymerization temperature, but rather at constant temperature by changing the hydrogen pressure.

The characteristic property of the waxes of the invention which ensures that they have a suitable chain length is the viscosity in the melt at 170° C. of less than 100 mPas.

EXAMPLE

In the examples below, the following abbreviations are used:

DSC=differential scanning calorimetry
GPC=gel permeation chromatography
GC=gas chromatography
$M_w$=weight average molar mass in g/mol determined by GPC
$M_n$=number average molar mass in g/mol determined by GPC
$M_w/M_n$=polydispersity Melting points (m.p.) and heat of fusion (ΔH) were determined by DSC measurements using a Perkin-Elmer DSC 7 at 10° C./min heating and cooling rates from the 2nd heating.

The melt viscosities (MV) have been determined at 170° C. using a rotation viscometer.

The isotactic index (I.I.) is determined by IR spectroscopy using the method of J. P. Luongo, J. Appl. Polym. Chem., 3, 302 (1960).

The chain ends of the polymers are studied by means of $^{13}$C-NMR spectroscopy as described in Polymer, 1989, Vol. 30, p. 428. If less than 10% of all end groups are isopropenyl end groups, the polymer is described as "saturated" in Table 1.

Example 1

An inert 100 dm$^3$ reactor was charged with 30 kg of propene and 12 mmol of triisobutylaluminum, the mixture was heated to 70° C. while stirring and 1.0 bar of hydrogen was metered in.

In parallel thereto, 31 mg of ethylenebis-1,1'-(tetrahydroindenyl)zirconium chloride are dissolved in 15 ml of a 10% strength by weight solution of methylaluminoxane in toluene and stirred. The polymerization is initiated by addition of the catalyst solution a little at a time and the internal temperature of the reactor is regulated at 70° C. Hydrogen was metered in while monitoring by GC and the concentration was kept constant at the initial value. After 1 hour, the polymerization was stopped by addition of $CO_2$, the reactor was vented and the product was drained as a melt. This resulted in 12.1 kg of PP wax. The GPC measurement indicated an $M_w$ of 3528 and $M_w/M_n$ of 2.1. The properties are summarized in Table 1.

Comparative Example 1

Example 1 was repeated but no hydrogen was metered in. The properties are summarized in Table 1. The GPC measurement indicates an $M_w$ of 12640 and an $M_w/M_n$ of 2.5.

Example 2

Example 1 was repeated using 83 mg of ethylenebis-1,1'-(4,7-dimethylindenyl)-zirconium dichloride and 100 mbar of hydrogen. This results in 9.7 kg of PP wax. The GPC measurement indicates an $M_w$ of 5346 and an $M_w/M_n$ of 2.7. The properties are summarized in Table 1.

Example 3

Example 1 was repeated using 60 mg of ethylenebis-1,1'-(2-methyltetrahydroindenyl)-zirconium dichloride and 0.3 bar of hydrogen. This results in 13.7 kg of PP wax. The GPC measurement indicates an $M_w$ of 6450 and an $M_w/M_n$ of 2.5. The properties are summarized in Table 1.

Example 4

Example 1 was repeated using 100 mg of ethylenebis-1,1'-(2-methylindenyl)zirconium dichloride and 2.5 bar of hydrogen. This results in 13.3 kg of PP wax. The GPC measurement indicates an $M_w$ of 6110 and an $M_w/M_n$ of 2.1. The properties are summarized in Table 1.

Example 5

Example 1 was repeated using 11 mg of ethylenebis-1,1'-(2-methyl-4-phenylindenyl)zirconium dichloride and 2.5 bar of hydrogen. This results in 12.2 kg of PP wax. The GPC measurement indicates an $M_w$ of 5591 and an $M_w/M_n$ of 2.27. The properties are summarized in Table 1.

Example 6

Example 1 was repeated using 50 mg, with 0.2 bar of hydrogen and 0.8 bar of ethylene being metered in. This results in 16.2 kg of propylene-ethylene copolymer wax. The GPC measurement indicates an $M_w$ of 4665 and an $M_w/M_n$ of 2.05. The properties are summarized in Table 1.

Example 7

The waxes from the preceding examples were heated at 200° C. for 4 hours in the presence of air in a drying oven. After cooling the samples, the discoloration was assessed with the aid of set of comparative samples (grade 1: colorless, grade 6: dark brown). The results of the heating tests (Table 1) show that waxes prepared in the presence of hydrogen have an improved thermal stability.

TABLE 1

| Ex. | Type | MV (170° C.) | m.p. [° C.] | ΔH [J/g] | I.I. | Chain ends | Color grade |
|---|---|---|---|---|---|---|---|
| 1 | C3-homo | 30 | 122 | 91 | 86 | saturated | 1–2 |
| C1 | C3-homo | 443 | 121 | 94 | 83,7 | unsaturated | 5–6 |
| 2 | C3-homo | 55 | 127 | 81 | 79 | saturated | 1 |
| 3 | C3-homo | 90 | 118 | 80 | 79 | saturated | 1 |
| 4 | C3-homo | 89 | 134 | 82 | 77,2 | saturated | 2 |
| 5 | C3-homo | 75 | 155 | 125 | 97 | saturated | 1–2 |
| 6 | C3/C2-copo. | 41 | 108 | 72 | 75 | saturated | 1 |

What is claimed is:

1. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising incorporating the wax in a toner.

2. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising incorporating the wax in a masterbatch.

3. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising incorporating the wax in a printing ink.

4. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising incorporating the wax in a surface coating.

5. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising incorporating the wax in a melt adhesive.

6. A method of using a polypropylene isotactic homopolymer or copolymer wax which has been prepared by polymerization using a bridged metallocene compound wherein said bridged metallocene compound comprises a hydrocarbon radical which forms a sandwich structure with a central atom and wherein said hydrocarbon radical is a substituted tetrahydroindenyl radical, unsubstituted tetrahydroindenyl radical, substituted cyclopentadienyl radical, substituted fluorenyl radical, substituted indenyl radical or substituted benzindenyl radical, in the presence of hydrogen and has a melt viscosity of less than 100 mPas, measured at 170° C., the method comprising adding the wax as an auxiliary in plastics processing.

7. A method of using a polypropylene isotactic homopolymer or copolymer wax having a melt viscosity of less than 98 mPas, measured at 170° C. and an isotactic index of greater than 70%, the method comprising incorporating the wax in a toner.

8. A method of using a polypropylene isotactic homopolymer or copolymer wax having a melt viscosity of less than 98 mPas, measured at 170° C. and an isotactic index of greater than 70%, the method comprising incorporating the wax in a masterbatch.

9. A method of using a polypropylene isotactic homopolymer or copolymer wax having a melt viscosity of less than 98 mPas, measured at 170° C. and an isotactic index of greater than 70%, the method comprising incorporating the wax in a printing ink.

10. A method of using a polypropylene isotactic homopolymer or copolymer wax having a melt viscosity of less than 98 mPas, measured at 170° C. and an isotactic index of greater than 70%, the method comprising incorporating the wax in a surface coating.

11. A method of using a polypropylene isotactic homopolymer or copolymer wax having a melt viscosity of less than 98 mPas, measured at 170° C. and an isotactic index of greater than 70%, the method comprising incorporating the wax in a melt adhesive.

12. A method of using a polypropylene isotactic homopolymer or copolymer wax having a melt viscosity of less than 98 mPas, measured at 170° C. and an isotactic index of greater than 70%, the method comprising adding the wax as an auxiliary in plastics processing.

* * * * *